(12) United States Patent
Kurtz et al.

(10) Patent No.: US 6,688,182 B2
(45) Date of Patent: Feb. 10, 2004

(54) STATIC PITOT TRANSDUCER

(75) Inventors: Anthony D. Kurtz, Ridgewood, NJ (US); Joseph Van De Weert, Cliffside Park, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 10/214,263

(22) Filed: Aug. 7, 2002

(65) Prior Publication Data

US 2003/0140704 A1 Jul. 31, 2003

Related U.S. Application Data

(63) Continuation-in-part of application No. 10/062,845, filed on Jan. 31, 2002.

(51) Int. Cl.$^7$ ................................................. G01L 9/06
(52) U.S. Cl. ........................................................ 73/727
(58) Field of Search ........................ 257/415, 417–419, 257/684, 710; 438/456; 29/25.41, 25.42; 361/283.4; 73/715–727, 754

(56) References Cited

U.S. PATENT DOCUMENTS 5,955,771 A  9/1999 Kurtz et al. ................ 257/419
6,272,928 B1  8/2001 Kurtz ........................... 73/721

*Primary Examiner*—William Oen
(74) *Attorney, Agent, or Firm*—Duane Morris LLP

(57) ABSTRACT

A differential and absolute transducer are secured to a Pyrex glass header by means of a glass metal frit or other suitable interface. One of the sensors measures absolute pressure and the sensor is a sealed cavity, while the other sensor is designed to measure differential pressure and the sensor is an aperture which permits the pressure media to reach both sides of the sensor. The header itself has a through hole connected to a tube over which the differential sensor is affixed. The Pyrex glass is chosen to match the coefficient expansion of the sensors. The header in turn is attached to an adapter that enables static pressure to be applied to both sensors simultaneously and total pressure applied to the differential sensor, thus permitting the measurement of the difference between the total pressure and the static pressure. Each of the sensors is fabricated by the same processing techniques and is of the same thickness, but have different deflecting areas such that the differential sensor will have a greater stress through the same pressure. By obtaining both the differential and the static pressure, one can now determine air speed by the solution of Bernoulli's theorem for a total pressure in a compressible flow, such as through air or any other fluid.

20 Claims, 7 Drawing Sheets

STATIC PITOT TRANSDUCER

This application is a continuation-in-part of U.S. patent application Ser. No. 10/062,845 entitled STATUS PITOT TRANSDUCER and filed on Jan. 31, 2002.

FIELD OF INVENTION

This invention relates to a method and structure for fabricating an improved static-pitot pressure transducer.

BACKGROUND OF THE INVENTION

The ability to determine air speed from measurement of the static (barometric) air pressure and the pitot air pressure induced by the movement of a vehicle through air has long been known from the Bernoulli's theorem for total pressure in an incompressible flow such as through air or any other fluid. Bernoulli states that the static pressure and dynamic pressure is equal to the total pressure. This can be expressed by the following equation as $$P_S + \frac{1}{2}\rho v^2 = P_T$$

where Ps=static pressure
$P_T$=total pressure
ρ=density of fluid
v=speed of fluid velocity
For an ideal gas such as air, this equation reduces to $$V = \sqrt{\frac{2RT}{M}\frac{P\Delta}{P_S}}$$

where PΔ difference between the total pressure and the static pressure for an ideal gas.

$$\rho = \frac{P_S M}{RT}$$

with
M=molecular mass, T=absolute temperature, R=Universal gas constant and Ps=static pressure.

Thus, to obtain air speed v, one must accurately measure $P_S$, PΔ and T and then perform the required computations. It is, of course, clear that the accurate determination of v requires very accurate measurements of the static pressure $P_S$ and the differential pressure PΔ. The basic concept of obtaining air speed from pressure measurements is very old, and there are countless methods and structures for accomplishing the same. However, most previous structures are either too inaccurate, too large, too costly or too fragile and often all of the above. For example, a pitot tube air speed indicator consists of two elements, where one is a dynamic tube which points upstream and determines the dynamic pressure and the other is a static tube which points normal to the air stream and determines a static pressure at the same point. These tubes are connected to two sides of a manometer or an inclined gauge such as to obtain a reading of velocity pressure, which is the algebraic difference between the total pressure and the static pressure. In any event, such tubes have been used in aerospace applications and can also be used as a liquid flow-measuring device, but because of their tendency to clog, cannot be used with liquids which have suspended solid matter.

This is an example of a very old prior art device, which has many, many problems including being very large, fragile and so on.

It is therefore an object of the present invention to provide an improved method to produce a smaller, cheaper, more rugged, highly accurate static pitot pressure transducer, which is also capable of accurately measuring air speed.

SUMMARY OF INVENTION

The present invention employs two uniquely designed dielectrically isolated leadless piezoresistive semiconductor sensors on a specially designed Pyrex glass header using an inorganic ceramic glass to secure the diaphragm to the header and a glass metal frit to interconnect the two diaphragms to the requisite pins or terminals on the header. One of the sensors is designed to measure absolute pressure and, as such, has a sealed cavity, while the other sensor is designed to measure differential pressure and, as such, has an aperture which permits the pressure media to reach both sides of the sensor. The header itself has a through hole connected to a tube over which the differential sensor is affixed. The Pyrex glass is chosen so as to match the expansion coefficient of the sensor. The header is attached to a tubular member provided with a fitting such that static pressure can be applied to both sensors simultaneously. At the other end of the tubular member, there is provided another fitting attached to the tube in the header through which the total pressure can be applied to the differential sensor, thus permitting the measurement of the difference between the total pressure and the static pressure. Each of the sensors is fabricated using the same processing techniques and can be fabricated from the adjacent pieces of the same semiconductor wafer. The sensors are of the same thickness, but have different deflecting areas such that the differential sensor would have the greater stress upon it for the same pressure. The design of the sensors and the header leads to several unanticipated advantages. Since the expansion coefficient of the Pyrex matches that of the sensor so closely, not only is the induced thermal stress very low, but it does not vary with time resulting in an apparatus that is much more stable. In addition, since the sensors have the same thickness and are made by the same process, they match each other more closely allowing their individual variations to cancel each out.

On the total pressure end of the tubular structure there is also affixed a probe containing an RTD (a resistive temperature device) such that the temperature of the dynamic airflow may be measured. There is also provided various electronic circuits so that the air speed and other parameters may be accurately calculated based on the measurement of the differential and static pressures as determined by the above noted-equations.

DETAILED DESCRIPTION OF THE FIGURES

Figure 1:
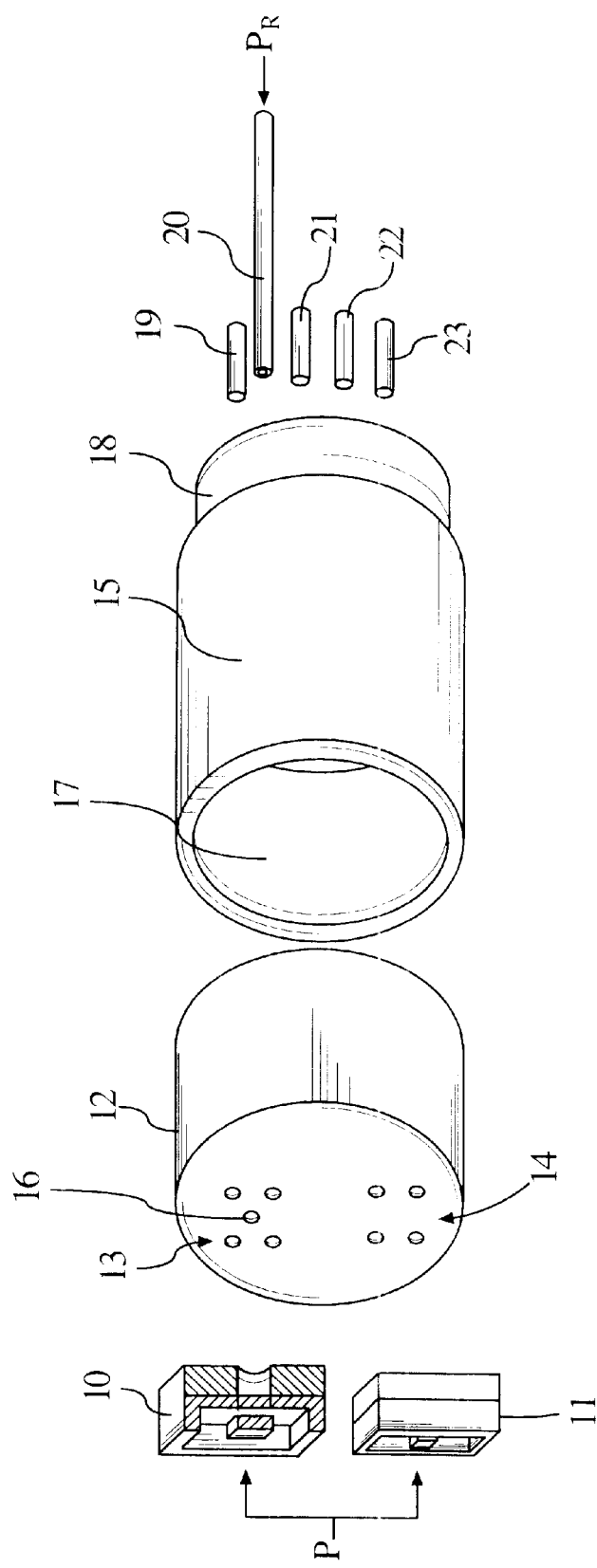
FIG. 1 is an exploded view showing an absolute and differential pressure transducer including the glass header and the header shell for a pitot device according to this invention.

Referring to FIG. 1, there is shown an assembly which consists of an absolute pressure sensor 11 and a differential pressure sensor 10. The pressure sensors 11 and 10 are shown in cross section and essentially are determined to be an absolute and differential pressure sensor because of the application of pressure to the sensors. In the case of the absolute sensor 11, that sensor, as will be explained, receives a single applied pressure to a top surface indicative of the static pressure. Pressure sensor 10 receives both the static pressure on the top surface and receives a reference pressure via the reference tube 16. The fabrication of such sensors is well known in the art based on some of the work implemented by Kulite Semiconductor Products, Inc., the assignee herein. A co-pending patent application Ser. No. 10/016,035, filed on Dec. 12, 2001 and entitled, "Combined Absolute Differential Transducer" depicts pressure sensors which can be employed for sensors 10 and 11 and, in fact, that application does disclose absolute and differential pressure sensors which can, in fact, be fabricated from the same wafer or from separate wafers as, for example, shown in FIG. 1. Reference is also made to U.S. Pat. No. 6,272,928 entitled, "Hermetically Sealed Absolute and Differential Pressure Transducers" issued on Aug. 14, 2001 to A. D. Kurtz, the inventor herein and assigned to the assignee herein. Reference is also made to U.S. Pat. No. 5,955,771 entitled, "Sensors for use in High Vibrational Applications and Methods for Fabricating Same", which issued on Sep. 21, 1999 to A. D. Kurtz et al. and assigned to Kulite Semiconductor Products, Inc. The sensors 10 and 11 are fabricated according to the processes described in the above noted patents and are generally designated as leadless sensors. They are fabricated from silicon and have dielectrically isolated piezoresistors located on the diaphragm region of the sensor. The sensors have glass covers or support structures and are fabricated using sacrificial silicon wafers with pattern wafers. This technology is clear from the above-noted patents, all of which are incorporated herein by reference.

As will be explained, sensors 11 and 10 are associated and would be mounted on a Pyrex header 12. The header 12 is fabricated from Pyrex and has through holes as the four holes designated by reference numeral 14 associated with the absolute sensor 11 and five holes designated by numeral 13 associated with the differential sensor 10. The central hole 16 is the hole for receiving the reference tube or reference pressure. The hole configurations 13 and 14 are all directed through the glass header 12, which is again a Pyrex header. The holes 13 and 14 are to accommodate terminal pins which, as will be explained, enable contact to be made to the piezoresistive transducer arrangements formed on the absolute and the differential sensors 10 and 11. Each of the sensors are secured to the header 12 by means of inorganic ceramic glass, which secures the diaphragms to the header and a glass metal frit which interconnects the two sensors and associated diaphragms to the requisite pins on the header. The pins are designated by reference numerals 19, 21, 22 and 23, while the reference tube is designated by numeral 20. As seen, the Pyrex header is inserted into aperture 17, which forms part of a header shell 15. The header shell 15 can be fabricated from a suitable metal or other material. The header has a bottom recess 18 for insertion into another housing, as will be explained. The header shell 15 also has corresponding apertures so that the pins and reference tubes can be inserted through the corresponding apertures in the header and make contact with the absolute and the differential pressure sensors 10 and 11.

As indicated, the sensors are made by the same processing and, as indicated in the above-referenced co-pending application, can be made from adjacent pieces of the same semiconductor wafer or from different wafers using the same processing technique. Each sensor is of the same thickness, but has different deflecting areas. As seen in FIG. 1, the deflecting area of the differential sensor is such that the differential sensor will have a greater stress upon it for the same pressure applied to the top surface (designated by arrow P). As indicated, since the header 12 is fabricated from Pyrex, the Pyrex expansion coefficient matches the coefficient of the sensors extremely closely, as both sensors are fabricated using silicon technology. This causes an induced thermal stress, which is extremely low, and also does not vary with time, resulting in an apparatus that is extremely stable. Furthermore, since the sensors 10 and 11 have the same thickness and are made by the same process, they track and match each other very closely, allowing their individual variations to cancel.

Figure 2:
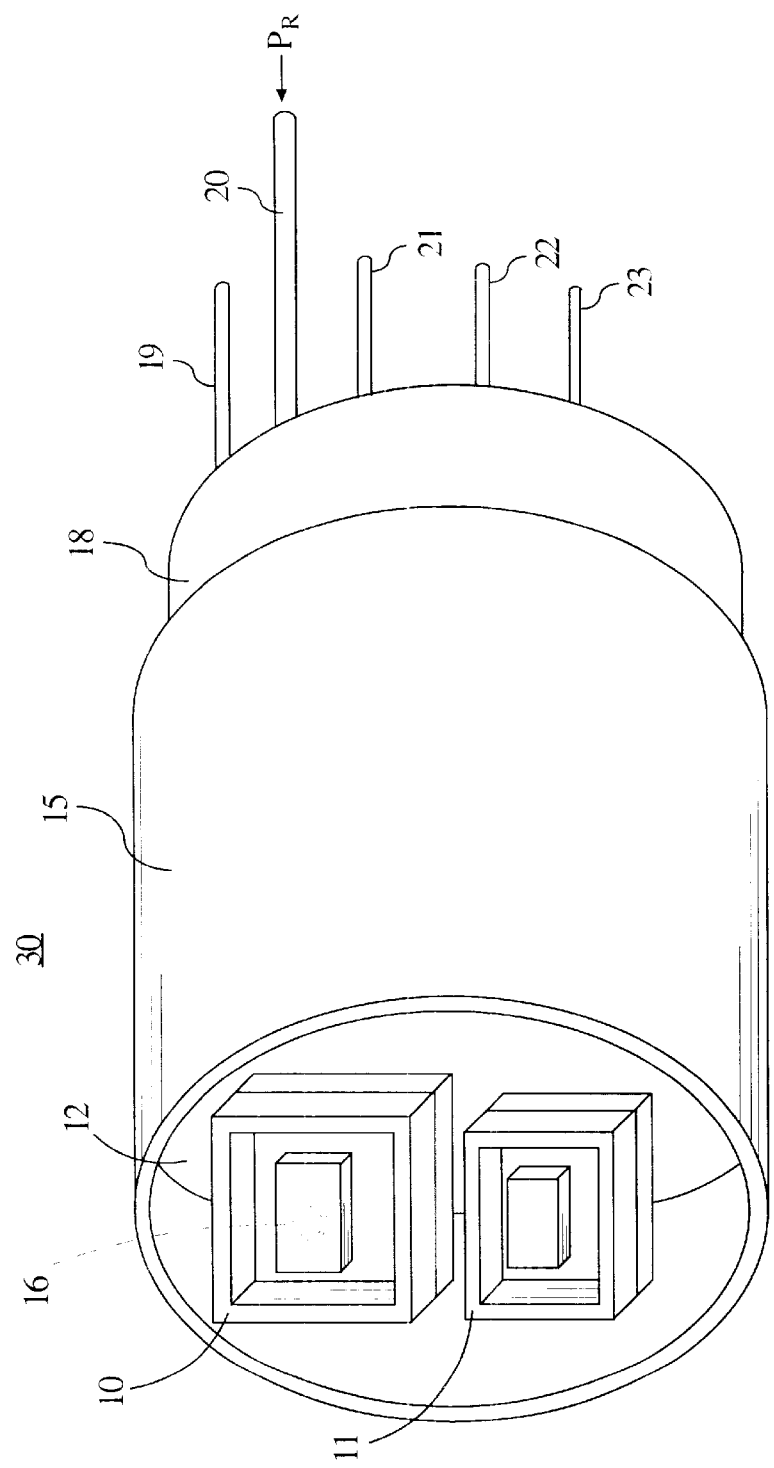
FIG. 2 shows the apparatus of FIG. 1 in an assembled perspective view.

Referring to FIG. 2, there is shown the assembled header 15 including the absolute sensor 11 and the differential sensor 10 secured to the glass header 12 with pins 23, 22, 21 and 19 making contact with the terminals of the piezoresistive sensors. The reference tube 20 being applied to the bottom port 16 of sensor 10 so that the differential sensor 10 can receive the pressure P applied to the top surface, as does the absolute sensor 11, while the differential sensor 10 also receives the reference pressure $P_R$ via tube 20. The pressure $P_R$ is applied to the underside of the diagram, as is known for developing differential pressure. Therefore FIG. 2 shows the assembled module, which for the sake of convenience, is designated by reference numeral 30.

Figure 3:
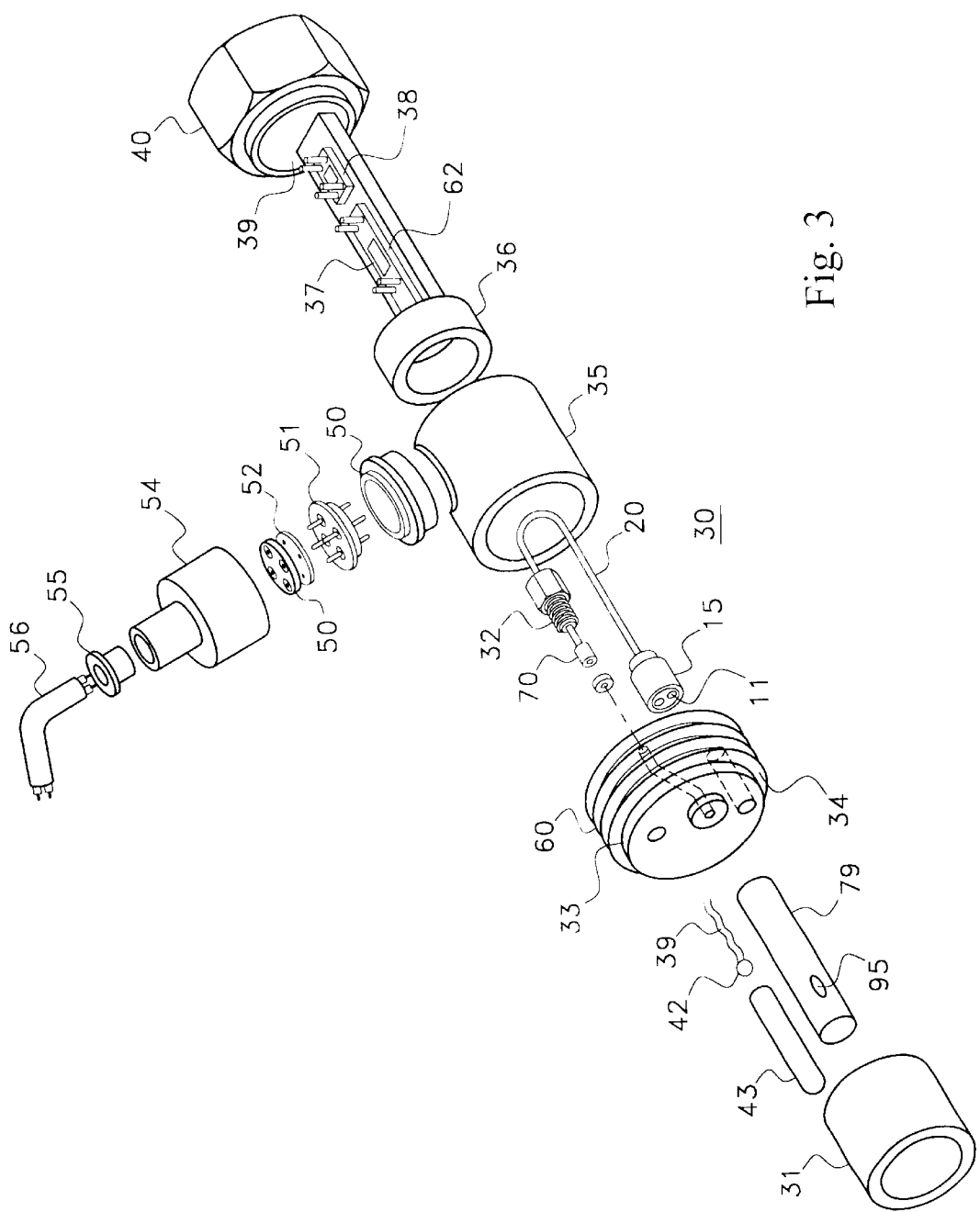
FIG. 3 shows an exploded view of a complete static pitot transducer according to this invention.
Figure 4:
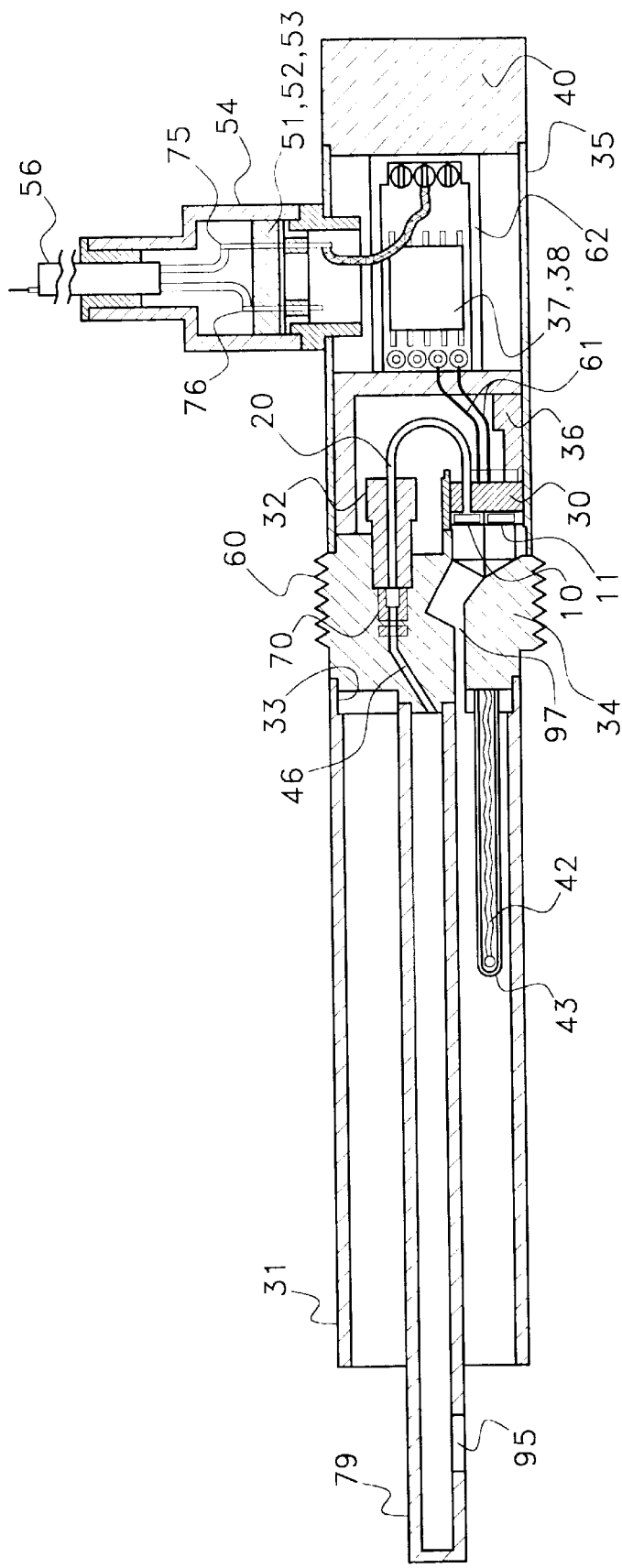
FIG. 4 shows a sectional view of the static pitot transducer of FIG. 3.

Referring collectively to FIGS. 3 and 4, there is shown a complete static pitot pressure transducer according to this invention. FIG. 3 is an exploded view of the pressure transducer and FIG. 4 is a sectional view of the pressure transducer. The assembled header 15 of FIG. 2, which includes the absolute pressure transducer 11 and the differential pressure transducer 10, is denoted by reference numeral 30 in FIGS. 3 and 4. The static pitot pressure transducer includes a header adapter 34 having a threaded outer surface 60 and first and second ends. The threaded outer surface 60 enables the device to be fastened to an aircraft, rocket, automobile, or the like. The assembled header 30 is mounted in the header adapter 34 from the second end thereof. The header adapter 34 is secured to a first open end of a housing sleeve 35 such that the header 30 is located inside the housing sleeve 35. A first pressure input tube 31, which essentially receives the static pressure, is coupled to a tube coupling portion 33 of the first end of the header adapter 34. The absolute and differential sensors 10 and 11 of the header 30 receive the input pressure applied to the pressure tube 31. An amplifier holder housing 36 containing a circuit substrate or board 62 with circuit modules 37 and 38 positioned thereon, is mounted inside the housing sleeve 35. The circuit modules 37 and 38 may include, for example, dividing and square rooting integrated circuits as will be explained. The circuit modules 37 and 38 are utilized to solve the above equations to enable one to obtain the airspeed and therefore utilize the value of the air speed to perform various functions. Wire conductors 61 (FIG. 4) couple the circuit substrate 62 to the output terminals of the absolute and differential sensors 10 and 11. A second open end of the housing sleeve 35 is sealed with a closure 40.

A reference pressure tube 79 is coupled to the first end of the header adapter 34. The reference pressure tube 79 extends through the first pressure input tube 31 and terminates just beyond the open end thereof. The side wall of the reference pressure tube 79 includes an opening 95 that receives a reference pressure that is directed by the tube 79 to a port 96 (FIG. 4) extending through the header adapter 34. The reference tube 20 associated with the differential sensor 10 of the header 30, is coupled to the port 96 of the header adapter 34 via a ferrule 70 and retained by a nut 32. The port 96 directs the reference pressure into the reference tube 20, which in turn, directs the reference pressure to the differential sensor 10 of the header 30.

A resistive temperature-sensing device (RTD) 42 for measuring temperature T, is further coupled to the first end of the header adapter 34. The RTD 42 is located inside the first pressure input tube 31 and is covered by a sheath 43. The output 39 (FIG. 3) of the RTD 42 is coupled to the circuit modules 37 and 38 by wire conductors (not shown).

Co-extensive with the housing sleeve 35 is a second header adapter 50, which accommodates a second header 51. The second header 51 accommodates insulator member 52, which is placed on the second header 51 to insulate an array of capacitors 53 that filter a biasing voltage which is utilized to bias the integrated circuits 37 and 38 on the substrate 62. The second header 51 and the capacitor array 53 are secured to the housing sleeve 35 by a cable release header 54. A crimp ring 55 secures a biasing cable 56, which is coupled to terminals 75 and 76 of the capacitor array 53.

As one can see from FIGS. 3 and 4, static pressure is applied to both the absolute and differential sensors 10 and 11 simultaneously via the first pressure input tube 31. At the same end of the device is the reference tube 79, which applies total pressure to the differential sensor 10 on the underside of the diaphragm and (the static pressure from input port 31 is applied on the top side of the diaphragm), thus, permitting the measurement of the difference between total pressure and static pressure. As indicated, each of the absolute and differential sensors 10 and 11 are made by the same processing and, in fact, may be made from adjacent pieces of the same semiconductor wafer.

Figure 5:
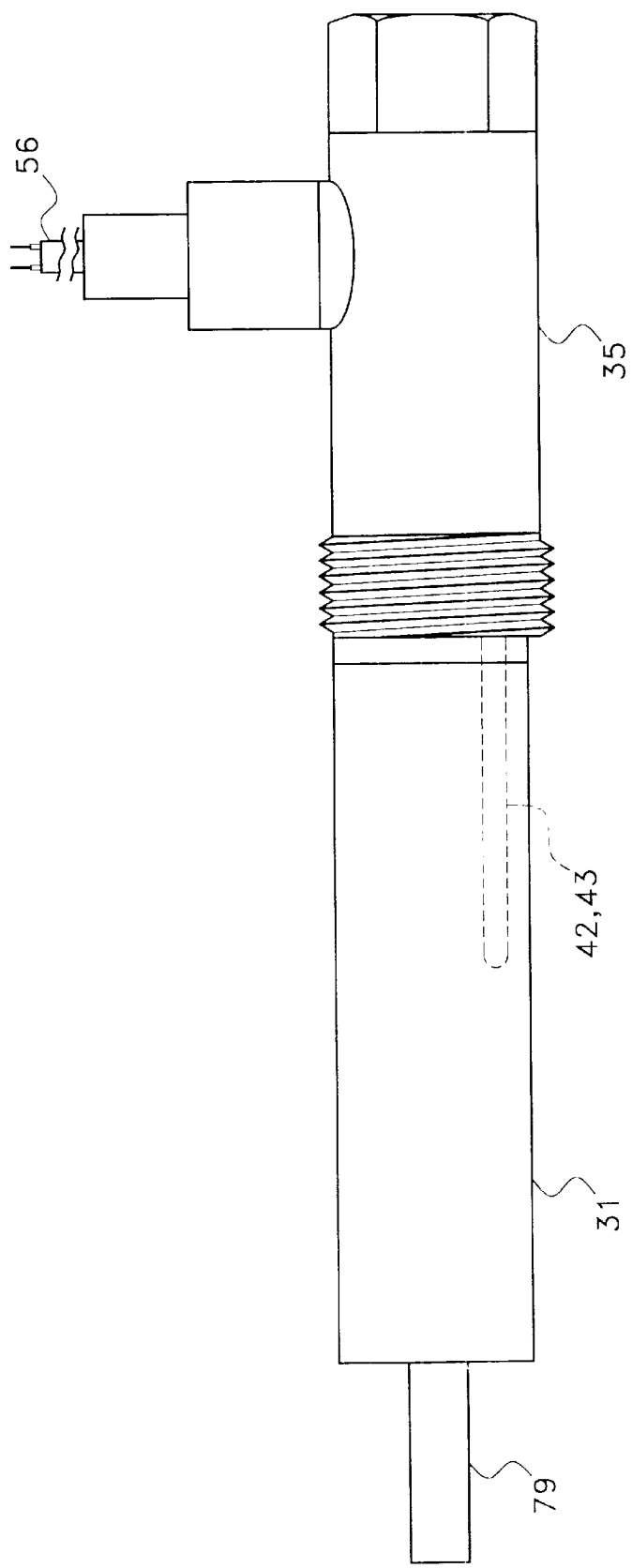
FIG. 5 shows a static pitot transducer of FIG. 3 and FIG. 4 in the diagram depicting actual size as compared to the size depicted in FIG. 4.

FIG. 5 shows a side view of the static pitot airspeed device of FIG. 4. The device has a length from the end of the reference pressure tube 79 to the closure 40 of about 2 and ¾ inches, while the height of the device from the input cable 56 to the bottom of the housing sleeve 35 is about 1½ inches.

Figure 6:
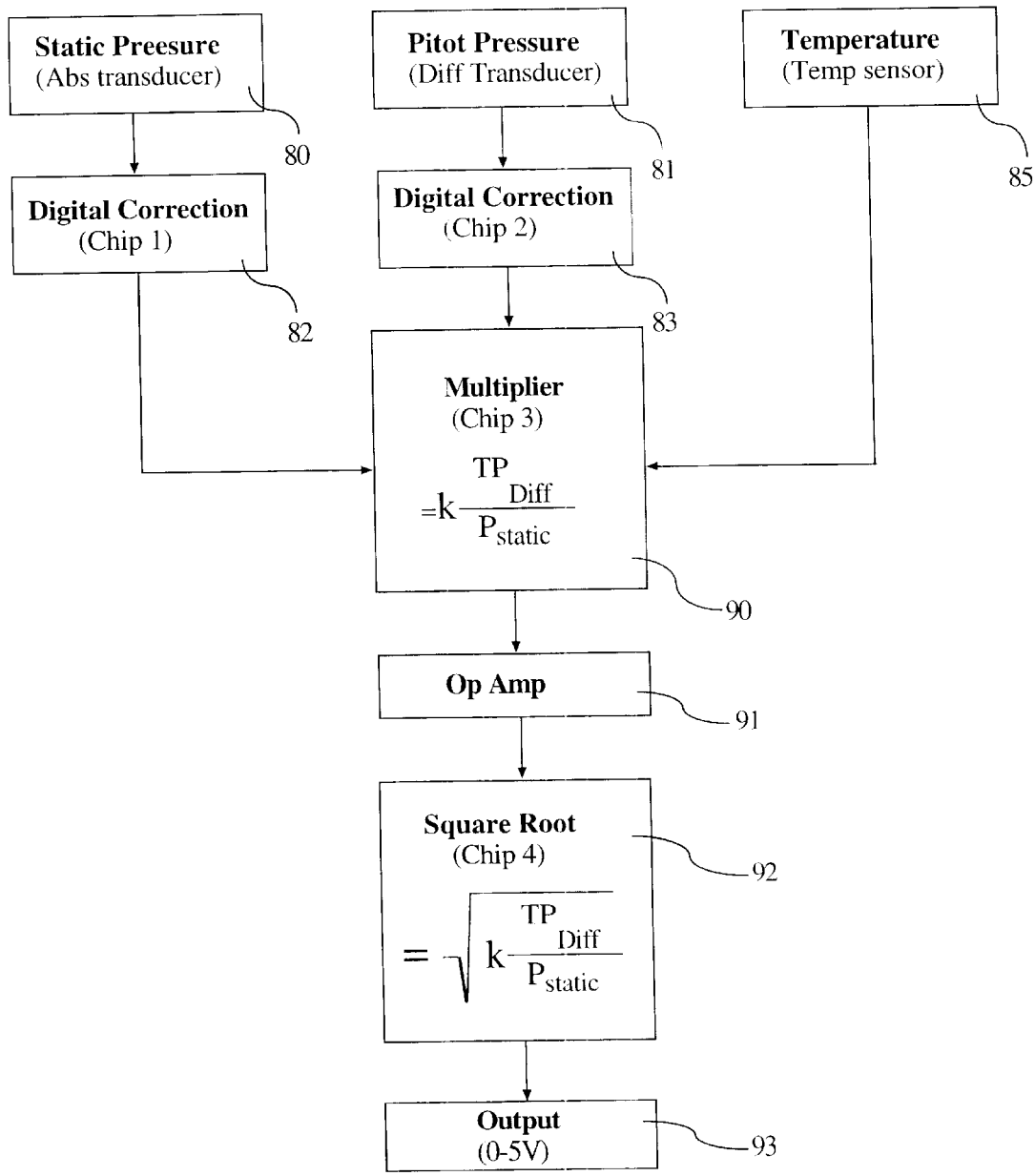
FIG. 6 is a block diagram showing the solution of the equations utilizing static pressure obtained from an absolute transducer and differential pitot pressure obtained from a differential transducer according to this invention.

As one can ascertain by referring to FIG. 6, there is shown a block diagram of the measurement of static air speed utilizing conventional digital circuits. Essentially, the static pressure, which is obtained from the absolute pressure transducer, is depicted by module 80, while the pitot pressure, which is obtained from the differential transducer, is indicated by module 81. The temperature of the unit is dictated by module 85 and essentially is determined by the RTD device. One performs digital correction by a first digital circuit 82 and a second digital circuit 83. Digital correction for pressure sensors is well known and the pressure sensors are compensated for pressure output by compensating the output according to temperature. Such techniques are well known in the prior art and, for example, the assignee herein has many patents which relate to the correction of sensor outputs according to temperature, voltage variation and so on.

As one can see, a first equation is shown in module 90. This equation is solved by the circuitry using the differential pressure (P diff), the static pressure (P static), the temperature (T) and a constant (K). As can be seen from above, this equation provides the Bernoulli constraints at an output. The output is applied to operational amplifier 91 for further amplification and then to a square root module 92. Module 92 obtains the square root of the above-noted output of module 90 to develop the output speed or fluid velocity v. This output is applied either to a further amplifier as indicated in module 93, or is taken directly as an output voltage. The measurement of speed as one can ascertain, has many applications. For example, one can measure air speed as well as ground speed. Essentially, by the determination of the speed, one can now adjust a spoiler or other device on an automobile according to the actual air speed of the automobile. In this manner, the spoiler will always be controlled according to the actual air speed and for example, as part of a feedback system, one can now determine the tilt of the spoiler in regard to actual air speed.

Figure 7:
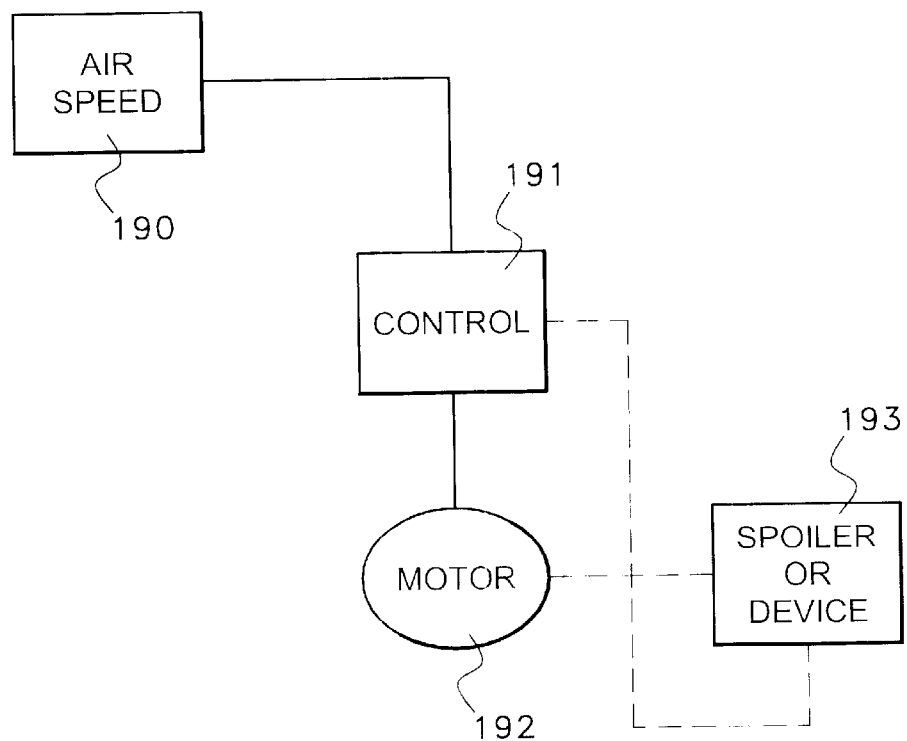
FIG. 7 shows a simple block diagram of a servo system which basically utilizes calculated air speed from the present device to determine the position or orientation of a spoiler or other device.

Referring to FIG. 7, there is shown a very simple servo system whereby the air speed as detected by the pitot detector described above, develops the output voltage indicative of speed in module 190. This voltage is applied to a control circuit 191 which may control a motor 192, depending on the voltage as defined by the air speed detector 190 and the control circuit 191. The motor 192 is coupled to a spoiler or other device 195 and therefore changes or moves the angle of the spoiler corresponding to the actual air speed. Therefore the lift on an automobile or the lift on an airplane is always accurately determined. For example, by such a system, the spoiler or any other device also has an input feedback to the controller 191 so that the control circuit 191 knows the position of the spoiler or any other device and controls it accordingly to the detected air speed 190. Controller 191 can be a microprocessor or other processing circuit. Thus, the ability to determine air speed has many applications as in aircrafts, rockets, as well as racing and conventional cars. As one can ascertain, the circuits which will provide or produce and solve the equations, for example, according to FIG. 6, are commercially available from many manufacturers.

It would, of course, be understood by one skilled in the art that there are many techniques for providing the solutions of the equations using the unique device as described above. It is therefore indicated that all such alternatives and devices are deemed to be incorporated herein and all such equivalent devices are also deemed to be incorporated herein.

As indicated, the invention has been described in preferred form with a certain degree of particularity. It is understood that the present disclosure of the preferred form is by way of example and many changes in the details of construction and combination and arrangement of parts made be made without departing from the spirit and scope of the invention as herein and as claimed.

What is claimed is:

1. Apparatus for providing an absolute and differential pressure output comprising:

first and second pressure sensors each of the same thickness and each fabricated by the same processing procedures, each having a different diaphragm area with at least one piezoresistive semiconductor device located on said diaphragm portion of each sensor and each sensor having a top and a bottom surface, a glass header having a first plurality of apertures associated with said first sensor and a second plurality of apertures associated with said second sensor, a pressure port through said header and located central to said second plurality of apertures to receive a reference pressure, said first sensor secured to said header at said bottom surface and aligned with said first plurality of apertures to define terminal contact areas for said first sensor, said second sensor secured to said header at said bottom surface and aligned with said second plurality of aperture to define terminal contact areas for said second sensor and with said pressure port located at said bottom surface of said second sensor within the diaphragm portion, means for applying a first pressure to said top surface of said first and second sensors and means for applying a reference pressure to said reference port whereby said first sensor provides an output indicative of said first pressure and said second sensor provides an output indicative of the difference between said first pressure and said reference pressure, wherein said first pressure is static pressure and said second sensor output is pitot pressure.

2. The apparatus according to claim 1 wherein said glass header is fabricated from Pyrex glass.

3. The apparatus according to claim 1 wherein said first and second sensors are silicon sensors.

4. The apparatus according to claim 1 wherein said first and second sensors are secured to said glass header by an inorganic ceramic glass.

5. The apparatus according to claim 1 wherein said terminal areas of each sensor contain a glass metal frit.

6. The apparatus according to claim 1 further including: an adapter having first and second ends and first and second, said header mounted in said second end of said adapter; a pressure inlet tube and a reference pressure tube coupled to said first end of said adapter; said pressure inlet tube introducing said first pressure to said top surfaces of said first and second sensors and said reference pressure tube co-acting with said pressure port in said glass header to provide a reference pressure to said second sensor.

7. The apparatus according to claim 6 operative to determine air speed including:

a first electronic circuit responsive to said output of said first sensor and said output of said second sensor to provide at an output the ratio of said second output to said first output indicative of the differential pressure divided by said first pressure, means for multiplying said output of said first circuit by the absolute temperature to provide a second output, a second electronic circuit for producing an output indicative of the square root of said second output which output is directly proportional to air speed (V).

8. The apparatus according to claim 7 wherein said second circuit produces an output according to the following equation $$v = \sqrt{K\frac{TPdiff}{Pstatic}}$$

where
v=air speed
T=temperature
K=constant (fixed value)
P diff is the output of said second sensor
P static is the output of said first sensor.

9. The apparatus according to claim 8 further including a biasing circuit for supplying operating potential to said first and second electronic circuits.

10. The apparatus according to claim 1 wherein said first sensor is an absolute pressure sensor and said second sensor is a differential pressure sensor.

11. The apparatus according to claim 10 wherein said diaphragm of said differential sensor has a greater stress applied to said diaphragm than the stress applied to said absolute sensor for the same pressure.

12. The apparatus according to claim 1 wherein said first and second sensors are each dielectrically isolated piezoresistive semiconductor sensors.

13. The apparatus according to claim 12 wherein said first and second sensors are fabricated from adjacent pieces of the same semiconductor wafer.

14. The apparatus according to claim 12 wherein said first and second sensors are fabricated from different semiconductor wafers.

15. The apparatus according to claim 6 further including a temperature-measuring device coupled to said first end of said adapter and operative to provide an output indicative of the operating temperature T within said pressure inlet tube.

16. The apparatus according to claim 15 wherein said temperature measuring device is an RTD.

17. The apparatus according to claim 1 wherein said first and second plurality of apertures contain a first and a second plurality of terminal pins for contacting said first and second sensors.

18. The apparatus according to claim 8 further including digital correction means coupled to said first and second sensors for adjusting the outputs according to temperature.

19. The apparatus according to claim 8 including a processor for solving said equation.

20. The apparatus according to claim 7 further including, means responsive to said output proportional to air speed for providing a control voltage according to the same, and means responsive to said control voltage for varying an air speed sensitive device orientation according to said control voltage.

* * * * *